United States Patent [19]

Nadler et al.

[11] 3,974,112

[45] Aug. 10, 1976

[54] FOIL LAMINATING ADHESIVE

[75] Inventors: Donald Nadler, Somerset; Carl F. Witzmann, Murray Hill, both of N.J.

[73] Assignee: National Starch and Chemical Corporation, Bridgewater, N.J.

[22] Filed: Feb. 28, 1975

[21] Appl. No.: 553,929

Related U.S. Application Data

[63] Continuation-in-part of Ser. No. 366,192, June 1, 1973, abandoned.

[52] U.S. Cl. ............... 260/4 R; 260/29.6 RW; 260/29.6 WB; 260/29.7 R; 260/29.7 W; 260/29.7 B

[51] Int. Cl.² .................. C08L 7/02; C08L 11/00; C08L 23/04; C08L 27/06

[58] Field of Search ....... 260/4, 29.6 RW, 29.6 WB, 260/29.7 B, 29.7 W, 29.7 R, 887, 889, 897, 901, 29.2

[56] References Cited

UNITED STATES PATENTS

| | | | |
|---|---|---|---|
| 2,763,633 | 9/1956 | Gray | 260/29.6 WB |
| 2,996,471 | 8/1961 | Reiter | 260/29.6 |
| 3,026,281 | 3/1962 | Harren et al. | 260/889 |
| 3,364,584 | 1/1968 | Zimmerman | 260/4 |

*Primary Examiner*—I. Ziegler
*Attorney, Agent, or Firm*—Thomas B. Graham

[57] ABSTRACT

An adhesive composition suitable for laminating thin foils to substrates, especially paper, is disclosed consisting essentially of an aqueous solution of a carboxylated vinyl acetate copolymer and a compatible, foil adherent, latex adhesive. These adhesives have the unique viscosity, drying, and adhesive properties required of foil laminating adhesives which were previously available only in foil laminating adhesives incorporating a casein thickener.

6 Claims, No Drawings

FOIL LAMINATING ADHESIVE

CROSS REFERENCE TO RELATED APPLICATIONS:

This application is a continuation-in-part of our copending application now abandoned Ser. No. 366,192 filed June 1, 1973 and assigned to the assignee of the instant application.

BACKGROUND OF THE INVENTION:

This invention relates to foil laminating adhesives and more particularly to latex foil laminating adhesives incorporating a carboxylated vinyl acetate copolymer thickener.

Adhesives useful for laminating thin metal foils such as aluminum foil to substrates such as paper and paperboard must possess certain properties which are not found in adhesives generally. In order to form the required thin film of adhesive between the foil and the substrate they must have special viscosity properties; in particular they must be to some extent thixotropic. In addition they must not dry out too rapidly when being applied, with consequent fouling of the laminating machine, and must not form hard deposits on the parts of the laminating machine which cannot be removed with water. These properties are not capable of definition in terms of exact numerical values determined by simple tests such as by measurement of viscosity, but are rather determined in actual practice by the performance of a particular adhesive when actually used in a laminating machine to laminate foil to a substrate. One skilled in the art of foil laminating can readily determine in actual use which adhesives are suitable for foil laminating by examining the performance of an adhesive when used in the laminating machine and by examining the laminated product.

Hitherto only foil laminating adhesives prepared by thickening an adhesive latex with an aqueous solution of casein have provided the required properties. The preferred foil laminating adhesive has been a polychloroprene latex thickened with casein. However, adhesives thickened with casein have certain disadvantages. Such adhesives tend to form lumps or settle in the container during storage. They are subject to viscosity increases with age. Since casein is a natural product it is subject to spoilage and also has an odor which is objectionable in some applications. Finally, since casein is a natural product the price is subject to the fluctuations of the market, hence securing an adequate supply of the material of the right quality and at a stable price can be a problem.

It has now been found that certain carboxylated vinyl acetate copolymers can be used as thickening agents for adhesive latices to produce a foil laminating adhesive having properties comparable to those of the best prior art foil laminating adhesives and with certain advantages over the prior art adhesives.

SUMMARY OF THE INVENTION

It is an object of this invention to provide improved foil laminating adhesives. A further object is to provide foil laminating adhesives which do not contain casein. A still further object is to provide foil laminating adhesives which use a carboxylated vinyl acetate copolymer as the thickening agent for a latex adhesive.

The novel foil laminating adhesives of this invention comprise

A. an aqueous solution of a water-soluble carboxylated vinyl acetate copolymer selected from the group consisting of copolymers of vinyl acetate and crotonic acid having monomer ratios of 92.5:7.5 per cent, by weight, to 87.5:12.5 per cent, by weight; copolymers of vinyl acetate and maleic acid having monomer ratios of 80:20 per cent, by weight, to 90:10 per cent, by weight; and copolymers of vinyl acetate and fumaric acid having monomer ratios of 80:20 per cent, by weight, to 90:10 per cent, by weight; and B. a compatible, foil adherent, latex adhesive.

The latex adhesive component of the foil laminating adhesive may be any latex adhesive which will adhere to metal foil. It is usually a colloidal dispersion of a natural or synthetic rubber or of a synthetic resinous adhesive in water at a solids concentration which may vary from 40 to 70 per cent of solids.

The carboxylated vinyl acetate copolymer is dissolved in water under alkaline condition and mixed with the latex adhesive in such proportions that the proportion of polymer is between 1 part, by weight, and 100 parts, by weight, per 100 parts, by weight, of adhesive solids in the latex.

DESCRIPTION OF THE PREFERRED EMBODIMENTS

The thickeners which have been found useful in the novel foil laminating adhesives of this invention are water-soluble carboxylated copolymers of vinyl acetate selected from the group consisting of copolymers of vinyl acetate and crotonic acid, copolymers of vinyl acetate and maleic acid, and copolymers of vinyl acetate and fumaric acid. The relative proportions of the different monomers in the copolymers may vary from 92.5:7.5 to 87.5:12.5 for the vinyl acetate/crotonic acid copolymers, from 80:20 to 90:10 for the vinyl acetate/maleic acid copolymers, and from 80:20 to 90:10 for the vinyl acetate/fumaric acid copolymers. Preferred copolymers are a copolymer of vinyl acetate and crotonic acid in a ratio of 90:10 by weight, a copolymer of vinyl acetate and maleic acid in a ratio of 85:15 by weight, and a copolymer of vinyl acetate and fumaric acid in a ratio of 85:15 by weight.

These polymers are in themselves not new and may be prepared by polymerization of the chosen monomers in the chosen proportions in aqueous solutions by conventional addition polymerization techniques. The polymers are then neutralized with ammonium hydroxide or an aminohydroxy compound having a molecular weight greater than 85 and a boiling point greater than 160°C. Typical copolymers are those disclosed in Reiter, et al., U.S. Pat. No. 2,996,471.

The adhesive latices to be used in the foil laminating adhesive of this invention are themselves conventional. They are colloidal dispersions of high molecular weight organic resinous or elastomeric adhesive polymers in an aqueous medium. They may contain 40 per cent to 70 per cent of solids, depending on the particular latex used. Typical latices contain between 45 and 60 per cent solids. The adhesive polymer component of the latices may be any of those which have been found to be useful in adhesive applications for adhering metal foils to substrates such as paper. Suitable adhesive polymers include natural rubber, synthetic rubbers such as styrene-butadiene rubber, synthetic elastomers such as polychloroprene, butadiene-acrylonitrile copolymers, polyacrylates, butyl rubber, polybutene, styrene-butadiene polymers. Various synthetic resins are also useful such as the various vinyl resins, vinyl acetate homo and copolymers, rosins and rosin esters, and the like. Preferred latices include emulsions of vinyl acetate-butyl acrylate copolymers and ethylene-vinyl acetate copolymers. A particularly preferred latex is an emulsion of a vinyl acetate-butyl acrylate copolymer in which the monomers are present in equal parts by weight.

The latex used must be compatible with the thickening polymer. If the latex is not compatible, it may be coagulated when it is mixed with an aqueous solution of the thickening polymer. The compatibility may easily be determined by simple testing, within the competence of one skilled in the art.

Likewise, the latex must be one which adheres to the metal foil. The particular adhesives which will adhere to the metal foil are well known and include those enumerated above. Some elastomeric and resinous polymers are themselves adherent to metal foil when used in the form of latices, others may require the addition of plasticizers to confer on them the property of adhering to metal foil. The particular latex to be used may be easily selected by the practitioner to provide the adhesive qualities desired.

The foil laminating adhesives of this invention are prepared by dissolving the thickening resin in water in the desired concentration and adjusting the pH of the solution to a range compatible with the latex to be used. Typically the pH is adjusted to the range 8.0 to 8.5. . When the thickener is completely dissolved, a process that usually requires stirring for 30 to 60 minutes, the latex is added and the composition is thoroughly mixed. Water may then be added to adjust the viscosity to the viscosity desired for a particular application.

In use, the foil laminating adhesive of this invention is applied to the foil by any conventional means such as by roll coating, doctor blade coating, or wirewound bar, the foil is laminated to the paper or paperboard substrate using sufficient pressure to assure good contact, and the laminate is allowed to dry.

The foil laminating adhesives of this invention have rheological properties comparable to the foil laminating adhesives which have been used commercially. They also are less susceptible to forming lumps or settling in the container during storage, have less odor, and are not subject to increase of viscosity with age. Furthermore, these adhesives are not subject to the spoilage which occurs with casein-thickened foil laminating adhesives.

The invention will be further illustrated by the following non-limiting examples. All parts given in the examples are by weight unless otherwise specified.

EXAMPLE I

This example illustrates a foil laminating adhesive prepared from a vinyl acetate/butyl acrylate latex thickened with a vinyl acetate/crotonic acid copolymer neutralized with ammonium hydroxide was dissolved in 35.0 parts of water and the pH of the mixture was adjusted with ammonium hydroxide to a pH of 8.0 to 8.5. The mixture was stirred for 60 minutes after which the polymer was completely dissolved. To this mixture 50.0 parts of a vinyl acetate/butyl acrylate copolymer latex were added and the mixture was thoroughly stirred until it was homogeneous. Water was then added to give a final composition as follows.

| | |
|---|---|
| Water | 58.0 parts |
| vinyl acetate/crotonic acid copolymer | 15.0 parts |
| Ammonium hydroxide | 1.2 parts |
| vinyl acetate/butyl/acrylate (50:50) copolymer latex (45% solids) | 50.0 parts |

The adhesive so prepared was compared with control adhesives which consisted of a commercial foil laminating adhesive having a polychloroprene adhesive polymer thickened with casein and a commercial adhesive having a vinyl adhesive polymer thickened with casein. Wet tack and filminess were evaluated by placing a small quantity of the adhesive on paper and noting tack and filminess to finger touch. The wet tack and filminess of the test adhesive were judged equivalent to those of the control adhesives.

To evaluate setting speed, a 0.0015-inch film of adhesive was cast on a sheet of kraft paper using a Bird applicator. A series of one inch wide strips of kraft paper was then immediately placed on the coated sheet and the assembly was lightly pressed together with a hand roller to insure uniform contact. Successive strips were then peeled off at two-second intervals until complete tearing of the paper fiber was observed. The elapsed time until the complete fiber tearing was observed was defined as the setting time.

Open time was evaluated in a similar test in which strips of kraft paper were applied to a film of adhesive cast on a kraft paper substrate in succession at 10 second intervals until the adhesive had dried and no bond could be formed. The time until bonding became impossible was defined as open time. The setting time and open time for the novel adhesive were found to be about the same as those of the control samples.

The thixotropic properties of the adhesive were evaluated by recording the viscosity at 72°F with a Brookfield RVF viscometer using spindle speeds of 2, 4, 10, and 20 revolutions per minute. The viscosities measured for the sample adhesive and for a control adhesive consisting of a commercial foil laminating adhesive made of a polychloroprene latex thickened with casein are listed in Table 1. A comparison of the recorded viscosities shows that the adhesive of this invention has properties similar to those of the control.

Table 1

| Spindle speed (rpm) | Viscosity (centipoises) | |
|---|---|---|
| | Example | Control |
| 20 | 3800 | 3900 |
| 10 | 4800 | 5000 |
| 4 | 7500 | 7600 |
| 2 | 11,000 | 9500 |

Adhesion was evaluated by coating a 0.00035-inch thick aluminum foil with a No. 3 wire wound bar and immediately applying to paper using a roller to insure uniform contact. After drying for 24 hours, 100 per cent fiber tear was observed, which indicated that the adhesion was satisfactory.

EXAMPLES II – IV

This example illustrates the properties of other adhesive formulations using a vinyl acetate/butyl acrylate latex thickened with a vinyl acetate/crotonic acid copolymer.

Adhesives were prepared similar to that of Example I having formulas as tabulated below (quantities in parts)

| Example | II | III | IV |
|---|---|---|---|
| Water | 70.0 | 0.5 | 48.0 |
| vinyl acetate/crotonic acid (90:10) copolymer | 21.4 | 0.2 | 15.0 |
| Ammonium hydroxide | 2.0 | 3.0 | 1.2 |
| vinyl acetate/butyl acrylate (50:50) latex (45% solids) | 50.0 | 50.0 | 50.0 |
| Glycerin | 3.0 | 3.0 | 3.0 |

These adhesives were tested by the procedures of Example I along with the control adhesive of that example. Setting speed, thixotropic properties, and adhesion were similar to those of the control. Those formulas containing glycerin showed longer open time than the adhesive of Example I, which presented advantages when applying the adhesive by machine.

EXAMPLE V

This example shows a foil laminating adhesive prepared from a butyl acrylate/vinyl acetate copolymer latex thickened with a vinyl acetate/crotonic acid copolymer resin.

An adhesive was prepared by the procedure of Example I having the following composition.

| | |
|---|---|
| Water | 34.6 parts |
| Vinyl acetate/crotonic acid (90:10) copolymer | 12.8 parts |
| Ammonium hydroxide | 1.3 parts |
| Butyl acrylate/vinyl acetate copolymer (75:25) latex (45% solids) | 50.0 parts |
| Glycerine | 3.0 parts |

The adhesive was tested by the procedure of Example I using the control adhesive of that example. Wet tack, filminess, setting speed, open time, and thixotropic properties were comparable to the control adhesive. Fiber tearing bonds were formed.

EXAMPLE VI

This example shows a foil laminating adhesive prepared from a styrene/butadiene copolymer latex thickened with a vinyl acetate/crotonic acid copolymer resin.

An adhesive was prepared by the procedure of Example I having the following composition.

| | |
|---|---|
| Water | 19.7 parts |
| Vinyl acetate/crotonic acid resin (90:10) | 6.1 parts |
| Ammonium hydroxide | 0.6 parts |
| Styrene/butadiene (50:50) copolymer latex (45% solids) | 50.0 parts |
| Glycerine | 3.0 parts |

The adhesive was tested by the procedure of Example I using the control adhesive of that example. Fiber tearing bonds were formed, and wet tack, filminess, setting speed, opentime, and thixotropic properties were comparable to those of the control.

EXAMPLE VII – IX

This example shows a series of foil laminating adhesives made with rubber type latices thickened with a vinyl acetate/crotonic acid copolymer resin.

Adhesives were prepared similar to that of Example I having formulas as tabulated below (quantities in parts).

| Example | VII | VIII | IX |
|---|---|---|---|
| Water | 9.3 | 15.2 | 18.2 |
| Vinyl acetate/crotonic acid copolymer (90:10) | 1.5 | 6.1 | 6.1 |
| Ammonium hydroxide | 0.2 | 0.7 | 0.7 |
| Polychloroprene latex (58% solids) | 50.0 | — | — |
| Butyl rubber latex (63% solids) | — | 50.0 | — |
| Natural rubber latex (62% solids) | — | — | 50.0 |
| Glycerine | 3.0 | 3.0 | 3.0 |

The adhesives were tested by the procedure of Example I along with the control adhesive of that example. In each case fiber tearing bonds were formed by the adhesives, and wet tack, filminess, setting speed, open time and thixotropic properties were comparable to those of the control.

EXAMPLE X

This example shows a foil laminating adhesive prepared from a plasticized polyvinyl acetate homopolymer latex thickened with a vinyl acetate/crotonic acid copolymer resin.

An adhesive was prepared by the procedure of Example I having the following composition

| | |
|---|---|
| Water | 4.5 parts |
| Vinyl acetate/crotonic acid copolymer (90:10) | 1.5 parts |
| Ammonium hydroxide | 0.2 parts |
| Polyvinyl acetate homopolymer latex (55% solids) | 40.0 parts |
| Dibutyl phthalate | 10.0 parts |
| Glycerine | 3.0 parts |

The adhesive was tested by the procedure of Example I along with the control adhesive of that example. Fiber-tearing bonds were formed, and wet tack, filminess, setting speed, open time, and thixotropic properties were similar to those of the control.

EXAMPLES XI – XII

These examples show foil laminating adhesives prepared from ethylene copolymer latices thickened with a vinyl acetate crotonic acid copolymer resin.

| Example | XI | XII |
|---|---|---|
| Water | 42.7 | 32.6 |
| Vinyl acetate/crotonic acid copolymer (90:10) | 13.0 | 12.8 |
| Ammonium hydroxide | 1.4 | 1.3 |
| Ethylene/vinyl acetate (85:15) copolymer latex (55% solids) | 50.0 | — |
| Ethylene/vinyl chloride (25:75) copolymer latex (47% solids) | — | 50.0 |

The adhesives were tested by the procedure of Example I along with the control adhesive of that example. In each case fiber-tearing bonds were formed by the adhesives, and wet tack, filminess, setting speed, open time, and thixotropic properties were comparable to those of the control.

EXAMPLE XIII

This example shows a foil laminating adhesive prepared from a mixture of latices thickened with a vinyl acetate/crotonic acid copolymer resin.

An adhesive was prepared by the procedure of Example I having the following composition.

| | |
|---|---|
| Water | 38.6 parts |
| Vinyl acetate/crotonic acid copolymer (90:10) | 12.8 parts |
| Ammonium hydroxide | 1.3 parts |
| Vinyl acetate/butyl acrylate (50:50) copolymer latex (45% solids) | 30.0 parts |
| Vinyl acetate/vinyl chloride (37.5:62.5) copolymer latex (49% solids) | 20.0 parts |
| Glycerine | 3.0 parts |

The adhesive was tested by the procedure of Example I along with the control adhesive of that example. Fiber-tearing bonds were formed, and wet tack, filminess, setting speed, open time, and thixotropic properties were comparable to those of the control.

EXAMPLE XIV

This example shows a foil laminating adhesive prepared from a vinyl acetate/butyl acrylate copolymer latex thickened with a vinyl acetate/fumeric acid copolymer resin.

An aqueous solution of a vinyl acetate/fumaric acid copolymer resin was prepared as follows.

A total of 57.50 parts of vinyl acetate, 15.0 parts of fumaric acid, and 0.675 parts of benzoyl peroxide was charged to a one liter round bottom flask equipped with stirrer, heater, and condenser. The mixture was heated to reflux temperature and held at that temperature for 15 minutes. Then 22.50 parts of vinyl acetate and a mixture of 38.50 parts of ethyl acetate and 0.95 parts of benzoyl peroxide were added simultaneously and uniformly through separate addition tubes over a period of four hours. After the addition was completed, the mixture was held at reflux temperature for three additional hours. Then 62.5 parts of ethyl acetate were added and the reaction mixture was cooled. The solvent was evaporated in an oven at a temperature of 90°C over a period of four hours. Forty parts of dried polymer (acidity 2.61 milliequivalents per gram) were dissolved in a mixture of 182 parts of water and 13.04 parts of 28 per cent aqueous ammonium hydroxide solution.

A foil laminating adhesive was prepared by the procedure of Example I having the following composition.

| | |
|---|---|
| Water | 36.2 parts |
| Ammonium hydroxide | 2.8 parts |
| Vinyl acetate/fumaric acid (85:15) copolymer | 6.7 parts |
| Vinyl acetate/butyl acrylate (50:50) copolymer latex (45% solids) | 53.0 parts |
| Glycerine | 1.6 parts |

The adhesive was tested by the procedure of Example I along with the control adhesive of that example. Fiber-tearing bonds were formed, and wet tack, filminess, setting speed, open time, and thixotropic properties were comparable to those of the control.

EXAMPLE XV

This example shows a foil laminating adhesive prepared from a vinyl acetate/butyl acrylate copolymer latex thickened with a vinyl acetate/monoethyl maleate copolymer resin.

A vinyl acetate/monoethyl maleate copolymer having the proportions of 85 parts of vinyl acetate monomer to 15 parts of monoethyl maleate monomer was prepared by a procedure similar to that described in Example XIV, except that an equivalent amount of monoethyl maleate was substituted for the fumaric acid of that example.

An adhesive was prepared by the procedure of Example I having the following composition.

| | |
|---|---|
| Water | 39.6 parts |
| Vinyl acetate/monoethyl maleate (85:15) copolymer | 6.5 parts |
| Ammonium hydroxide | 1.1 parts |
| Vinyl acetate/butyl acrylate (50:50) copolymer latex (45% solids) | 51.0 parts |
| Glycerine | 1.5 parts |

The adhesive was tested by the procedure of Example I along with the control adhesive of that example. Fiber-tearing bonds were formed, and wet tack, filminess, setting speed, open time, and thixotropic properties were comparable to those of the control.

In summary, this invention provides a novel foil laminating adhesive having properties equivalent to prior art adhesives of this type which uses a synthetic vinyl acetate copolymer thickener having advantages over the thickeners previously used in such adhesives.

Variations may be made in constituents, proportions and procedures without departing from the scope of this invention.

We claim:
1. A foil laminating adhesive consisting essentially of:
   A. an aqueous solution of a carboxylated vinyl acetate copolymer selected from the group consisting of copolymers of vinyl acetate and crotonic acid in the monomer ratios of 92.5:7.5 per cent, by weight, to 87.5:12.5 per cent, by weight; copolymers of vinyl acetate and maleic acid in the monomer ratios of 80:20 per cent, by weight, to 90:10 per cent, by weight; and copolymers of vinyl acetate and fumaric acid in the monomer ratios of 80:20 per cent, by weight, to 90:10 per cent, by weight; and
   B. a compatible, foil adherent, latex adhesive selected from the group consisting of latices of natural rubber, styrene-butadiene rubber, polychloroprene, butyl rubber, polyvinyl acetate homopolymers, copolymers of ethylene and vinyl acetate, copolymers of ethylene and vinyl chloride, copolymers of butyl acrylate and vinyl acetate and copolymers of vinyl acetate and vinyl chloride; wherein the carboxylated vinyl acetate copolymer is present in a proportion of 1 to 100 parts, by weight, per 100 parts, by weight, of latex adhesive solids.

2. An adhesive according to claim 1 wherein said latex adhesive is selected from the group consisting of latices of polyvinyl acetate homopolymers, copolymers of ethylene and vinyl acetate, copolymers of ethylene and vinyl chloride, copolymers of butyl acrylate and vinyl acetate, and copolymers of vinyl acetate and vinyl chloride.

3. An adhesive according to claim 1 wherein said carboxylated vinyl acetate copolymer is a copolymer of vinyl acetate and crotonic acid in the monomer ratio of 90:10 per cent, by weight.

4. An adhesive according to claim 1 wherein said carboxylated vinyl acetate copolymer is a copolymer of vinyl acetate and maleic acid in the monomer ratio of 85:15 per cent, by weight.

5. An adhesive according to claim 1 wherein said carboxylated vinyl acetate copolymer is a copolymer of vinyl acetate and fumaric acid in the monomer ratio of 85:15 per cent, by weight.

6. An adhesive according to claim 2 wherein said carboxylated vinyl acetate copolymer is a copolymer of vinyl acetate and crotonic acid in the monomer ratio of 90:10 per cent, by weight.

* * * * *